Aug. 11, 1970    A. L. GIRARDI    3,523,404
ORCHARD APPARATUS

Filed Jan. 30, 1967    8 Sheets-Sheet 3

Aug. 11, 1970   A. L. GIRARDI   3,523,404
ORCHARD APPARATUS

Filed Jan. 30, 1967   8 Sheets-Sheet 8

United States Patent Office

3,523,404
Patented Aug. 11, 1970

3,523,404
ORCHARD APPARATUS
Antonio Lawrence Girardi, 758 W. Acacia St.,
Salinas, Calif. 93901
Filed Jan. 30, 1967, Ser. No. 612,686
Int. Cl. B65b 67/02; B60p 1/50; A01a 19/04
U.S. Cl. 53—391        20 Claims

ABSTRACT OF THE DISCLOSURE

This invention relates to mobile apparatus designed for operation along aisles between rows of trees in an orchard and provided with an arched carriage frame through which large hampers for collecting fruit may be moved successively to and from a fruit collecting station between the ends of the carriage; and also provided with extensible booms mounted adjacent the ends of the carriage and arranged to be moved through wide angles of horizontal and vertical angular adjustment, said booms and the carriage being provided with extensible conveyors and associated devices for delivering fruit harvested by workmen supported on platforms at the ends of the booms to hampers successively moved to and from the fruit collecting station along and over a track extending longitudinally through the bottom portion of the carriage.

CROSS-REFERENCE TO RELATED APPLICATION

The present invention relates in part to, but does not include or claim subject matter disclosed and claimed in my copending application, Ser. No. 603,613, filed Dec. 21, 1966, for Support for Extensible Conveyors.

BACKGROUND OF THE INVENTION

The invention relates to orchard apparatus comprising a mobile carriage operable between the rows of trees of an orchard for transporting workmen through the orchard and for shifting their position relative to successive trees along the adjacent rows for harvesting fruit and for performing related operations such as pruning, spraying, thinning, and related functions. Applicant has been engaged in the development of equipment of this character for many years, and the present application includes improvements and refinements of equipment of the same general nature for which he has been granted numerous patents directed variously to the general organization of such apparatus and to particular devices incidental and/or accessorial to the apparatus, including Pats. Nos.:

2,798,623—July 9, 1957
2,902,142—Sept. 1, 1959
2,927,705—Mar. 8, 1960
2,961,991—Nov. 29, 1960
3,236,393—Feb. 22, 1966
3,244,299—Apr. 5, 1966
3,251,446—May 17, 1966
3,258,142—June 28, 1966
3,276,789—Oct. 4, 1966
3,294,216—Dec. 27, 1966

SUMMARY OF THE INVENTION

In terms of broad inclusion, the orchard apparatus of the present invention comprises a mobile carriage including a high arched frame adapted to straddle a hamper or bin of large capacity, the top and side portions of the frame defining a passage extending the full length of the carriage through which such hampers may move successively onto and along a track extending longitudinally of the frame at a level slightly above ground level. Means are provided for picking up hampers, previously placed along the path of the advancing machine, and moving them onto and along the track to a fruit receiving station within the frame; and as each hamper is loaded, moving it along the track and lowering it onto the ground at the trailing end of the carriage as it is moved along an aisle between rows of orchard trees.

Fruit is picked by workmen supported upon platforms which are suspended upon the outer ends of extensible booms at the ends of the carriage.

Each platform is arranged to support two workmen standing side by side, and each boom is mounted for adjustment through 360° around a vertical axis at a level above the top of the carriage, and through a range of about 270° around the sides and ends of the machine when lowered to approach ground level. Also the booms are adjustable through a vertical angle sufficient to raise and lower the platforms between a lower limit near ground level to an upper limit approaching the tops of the trees, thereby enabling the two workmen on each platform to gather the fruit from quadrants of the trees on each side of the machine, independently of the workmen on the other boom. Fruit picked by the workmen is conveyed through the booms to collection troughs at the mounting ends of the booms, and thence by conveyors arranged to move the fruit past grading means between the booms, and to deliver fruit of selected size to a hamper positioned at the fruit receiving station. The conveyors are extensible to conform to extension and retraction of the booms, and to extension and retraction of portions of the carriage frame.

The apparatus is propelled and steered by tractor tracks mounted along the outer sides of the main frame. All equipment, such as the power unit, fuel supply, pumps and storage tanks for operating hydraulic rams, is mounted outside the sides of the main carriage frame so as to cause no obstruction to movement of the carriage over hampers, or the movement of hampers through the carriage frame.

The invention also contemplates control mechanisms mounted upon each platform for controlling the extension and the angular adjustment of position of each boom independently of the other by a workman supported by the boom. Also, the invention contemplates a substantially centrally positioned control pillar on which are mounted controls for actuating the tracks to propel and to steer the carriage, to extend and retract telescoping end portions of the carriage frame, and to activate mechanism for picking up hampers and moving them to fruit receiving position. The pillar is of a height such that it is accessible from either platform when moved into reach thereof without need for the control operating workman to leave his platform.

It is among the objects of my present invention to provide improved mechanism by which fruit may be efficiently collected in hampers of large capacity which are picked up and moved to a loading station within the main frame of the machine at appropriate intervals as the machine is advanced along the aisle between adjacent rows of trees, filled hampers being delivered from the trailing end of the machine as it progresses along the aisle.

Another object is to provide a mobile apparatus having an arched frame shaped to straddle a hamper of large capacity, and to form a passage, extending longitudinally of the machine, through which hampers may be moved to and from a fruit receiving station between pickup and delivery points at opposite ends of the machine.

A still further object is to provide mechanism for moving hampers into a track extending longitudinally of the main frame slightly above ground level and along which the hampers may be moved successively to and from a fruit receiving station.

Another object is to provide a mobile apparatus having an arched main frame through which hampers of large capacity may be moved and which is propelled and steered by power driven tracks, said tracks and the power unit by which they are operated being mounted on the outer sides of the main frame, so as to cause no obstruction to the movement of hampers through the arched frame.

It is also among the objects of my present invention to provide an improved structure and arrangement of booms whereby workmen may be supported in pairs upon platforms mounted at the ends of booms adapted to be manipulated through a wide range of horizonzontal and vertical angular adjustment, so as to speed the harvesting operation and minimize loss of time due to differences in the abundance of fruit over various trees or differences in the speed and efficiency with which different workmen harvest the fruit.

I accomplish these and other objects, some of which with the foregoing will be more fully explained in the following specification, by means of the device shown in the drawings forming a part of this specification. The invention is not limited to the specific embodiments illustrated and described, as the invention may be otherwise embodied and practiced within the scope of the appended claims.

DESCRIPTION OF PREFERRED EMBODIMENTS

Referring specifically to the embodiment illustrated in the drawings, the apparatus of the present invention comprises an arched main carriage frame, designated in general by the numeral 21, comprising top cross frame members 22 and side frame members 23 and 24 are spaced from each other a distance such as permit movement of a fruit collecting hamper of larger capacity to be moved therebetween, and the top cross frame members are positioned at a height sufficient to clear the top of such hamper moved between the side members as hereinafter described.

Longitudinally extending top frame members 25 are secured to the top cross frame members 22, and together the frame members 22 and 25 define a substantially level deck 30 which may be surfaced over all or any part thereof with surfacing material of metal or other suitable material.

Figure 3:
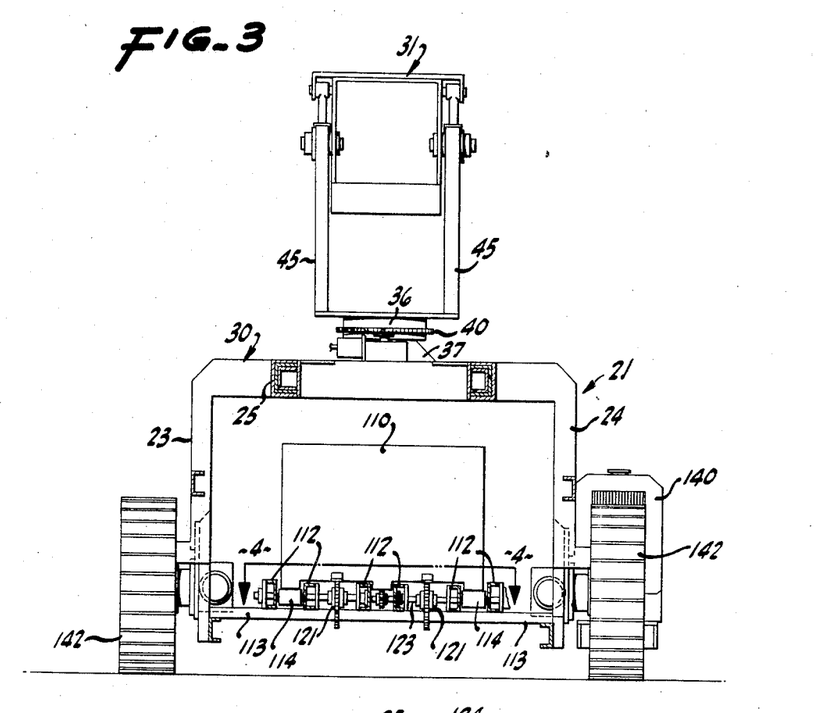
FIG. 3 is a transverse sectional view, partly in elevation, the plane of the section being indicated by the line 3—3 of FIG. 1 viewed in the direction indicated by the arrows.
Figure 15:
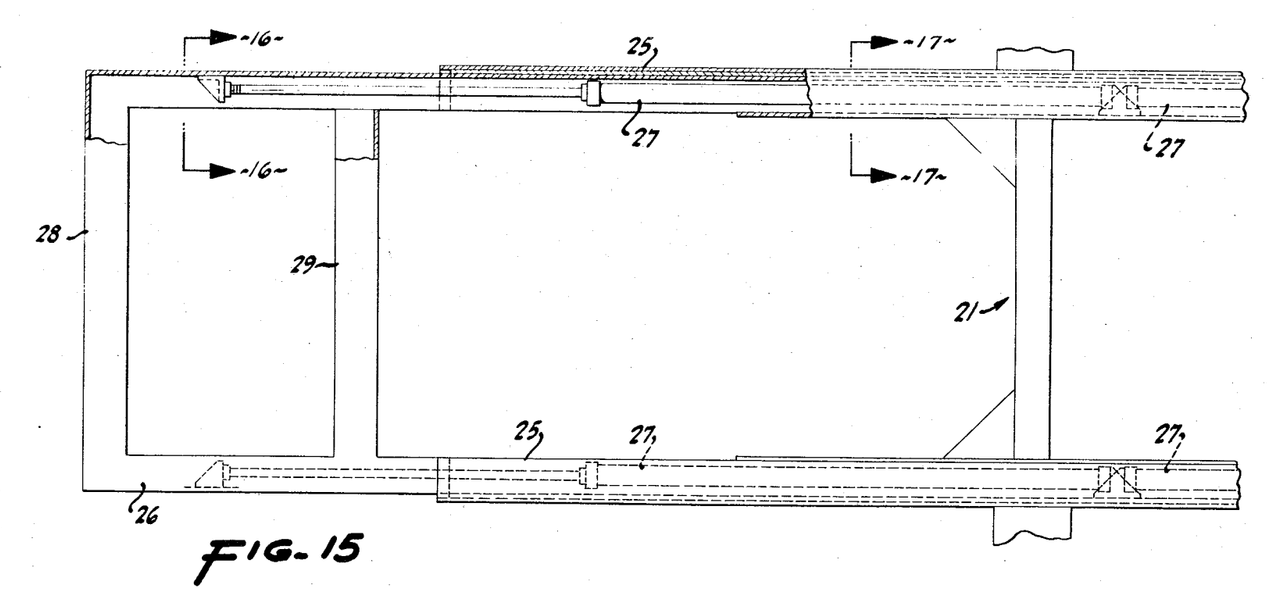
FIG. 15 is a broken plan view, partly in section, showing the extensible main frame and the actuating means for extending and retracting the end sections thereof.
Figure 16:
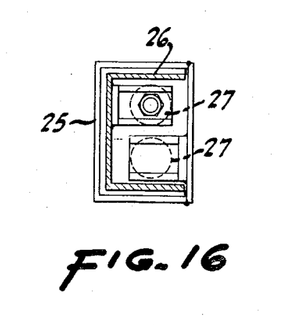
FIGS. 16 and 17 are transverse sectional views taken upon planes indicated by the lines 16—16 and 17—17 respectively of FIG. 15.
Figure 17:
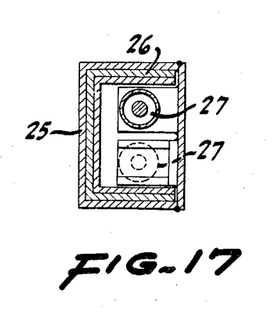
Figure 18:
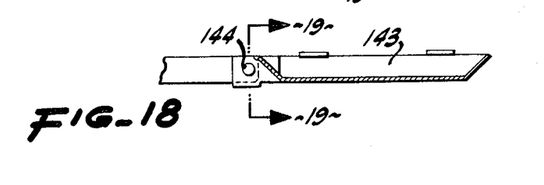
FIG. 18 is a fragmental sectional view of the engine mounting mechanism, the plane of the section being indicated by the line 18—18 of FIG. 2, viewed in the direction indicated by the arrows.
Figure 19:
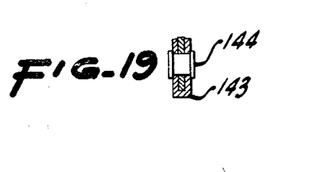
FIG. 19 is a transverse sectional view of the motor support as viewed upon the plane indicated by the line 19—19 of FIG. 18.

The longitudinal frame members 25 comprise a main central section of channel shape into which are fitted extensions 26 slidably telescoping into both ends thereof, as best shown in FIG. 3 and in FIGS. 15, 16, and 17 of the drawings. The extensions 26 are arranged to be moved between fully retracted positions, as shown in full lines in FIG. 1 of the drawings, to extended positions as indicated in dotted lines. The extensions 26 are actuated between their retracted and extending positions by hydraulic rams 27. The extensions are moved to fully retracted positions for storage, for movement to or from an orchard, and for shortening the machine to make turns around the ends of rows of trees in orchard operation. They are extended varying amounts to conform to the spacing of trees in the rows of an orchard. Extension and retraction is effected by hydraulic pressure in conventional manner, the pressure being manually controlled by valves positioned at a central control pillar, as hereinafter more fully explained.

Figure 9:
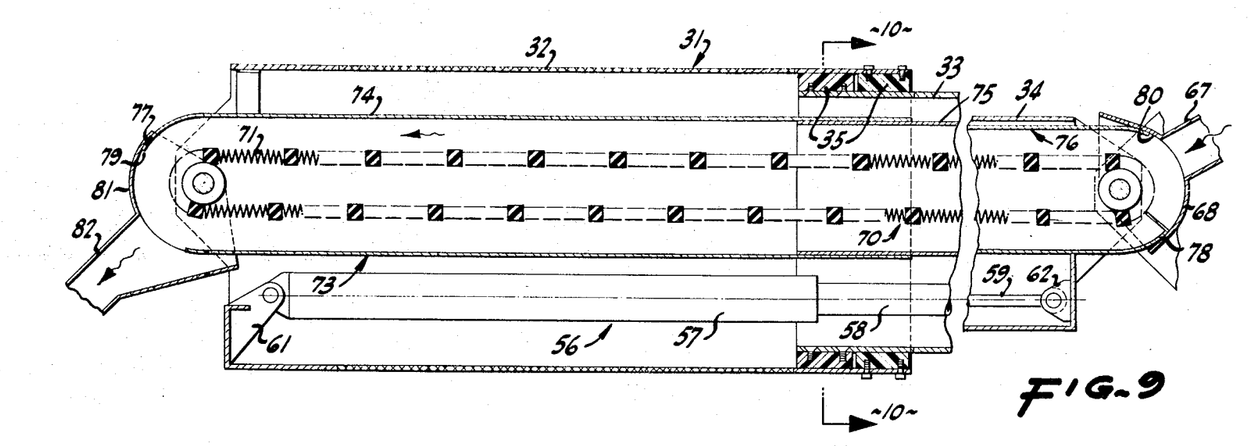
FIG. 9 is a longitudinal sectional view of the boom shown in FIG. 7, the plane of the section being indicated by the line 9—9 of FIG. 8, viewed in the direction indicated by the arrows.
Figure 10:
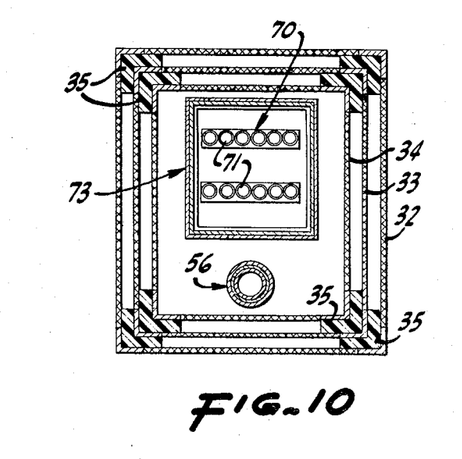
FIG. 10 is a transverse sectional view of the boom, the plane of the section being indicated by the line 10—10 of FIG. 9, viewed in the direction indicated by the arrows.

The end portions of the extensions 26 are joined and braced by cross members 28 and 29 to provide a frame work on which to mount an extensible boom, designated in general by the numeral 31, at each end of the carriage. Each boom preferably comprises a plurality of telescoping sections 32, 33 and 34 of rectangular cross section, as best shown in FIGS. 9 and 10 of the drawings. As illustrated, the boom comprises three sections telescoping one within another for extension and retraction between fully retracted positions as shown in full lines in FIG. 1 of the drawings and extended positions as indicated in dotted lines in that figure, the fully extended position also being shown in FIGS. 7 and 9. Blocks 35 of antifriction bearing material such as Teflon are mounted in the corners at the ends of each section, as best shown in FIGS. 9 and 10 of the drawings. The blocks 35 minimize friction between the sections as they are extended and retracted, and at the same time serve as abutments limiting the movement of the inner sections 34 and 33 outwardly from the sections 33 and 32 with which they telescope respectively.

Figure 1:
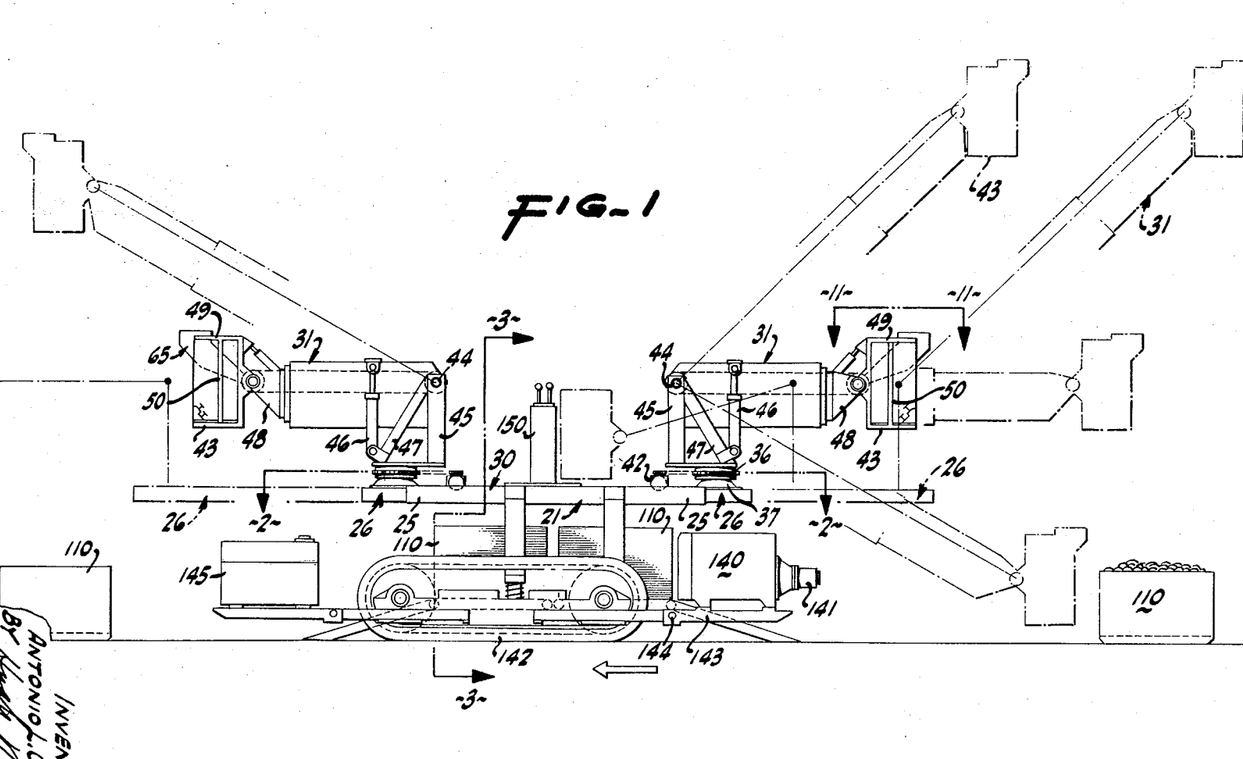
FIG. 1 is a side elevational view of the machine illustrating in general the relationship and range of operation of various parts.
Figure 2:
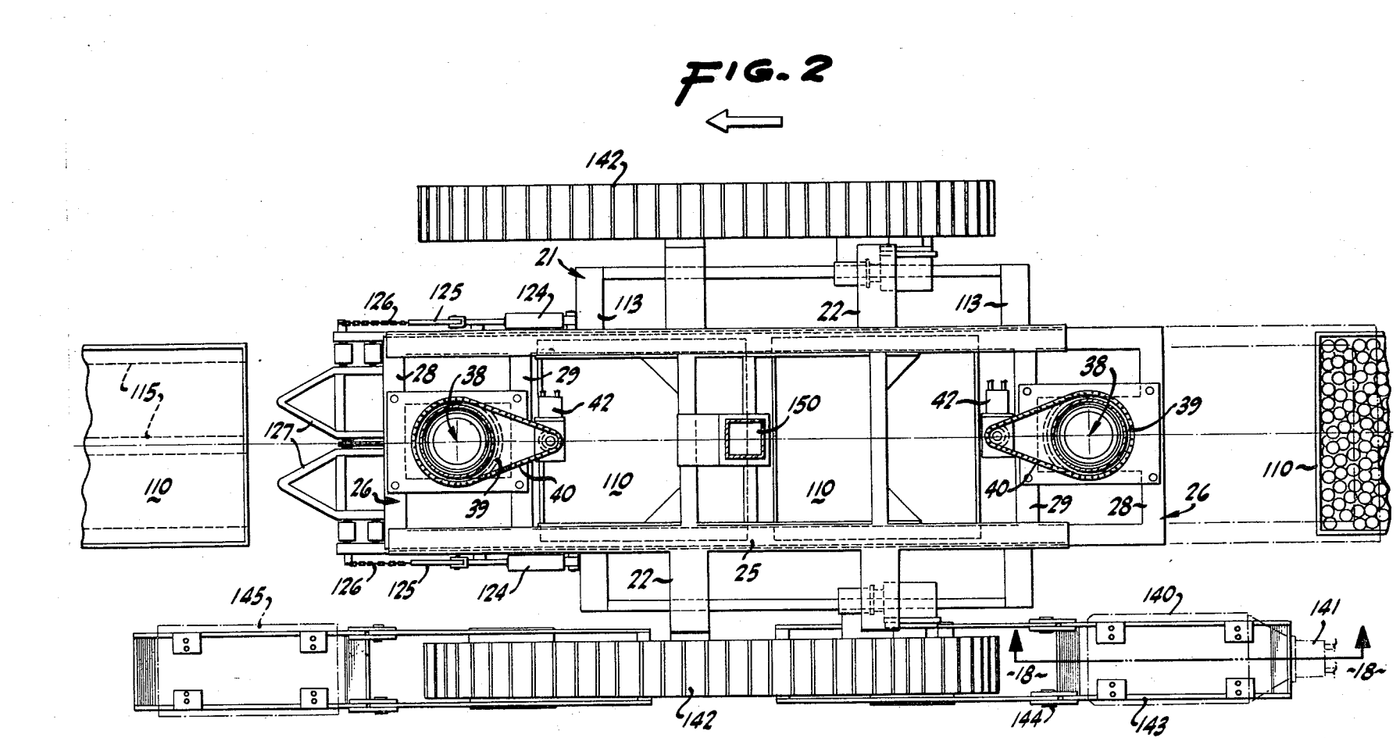
FIG. 2 is a horizontal sectional view, the plane of the section being indicated by the line 2—2 of FIG. 1, viewed in the direction indicated by arrows, underlying portions being shown in plan.
Figures 7, 8:
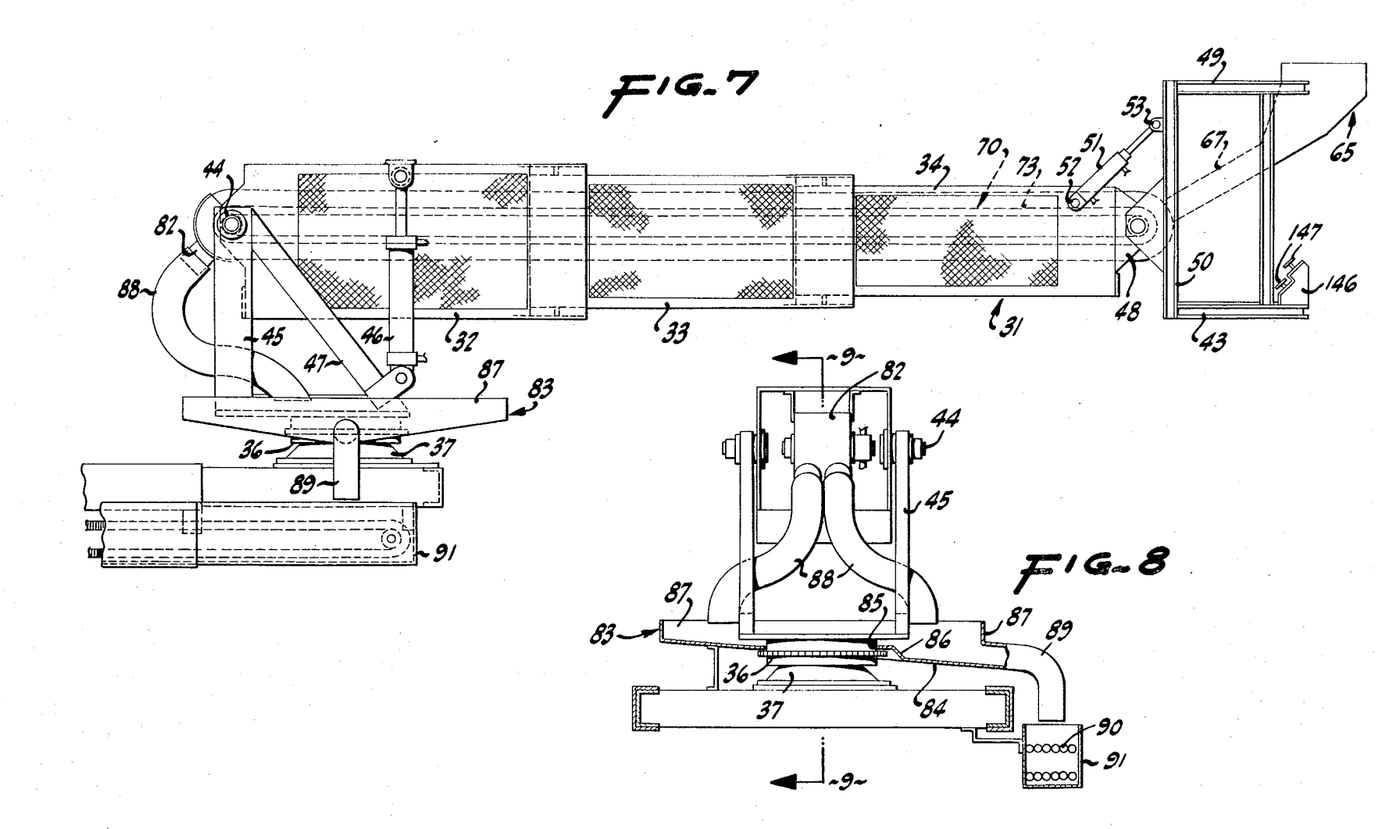
FIG. 7 is a side elevational view of one of the booms by which pickers are supported in various positions around the trees of an orchard.
FIG. 8 is an end elevation of the mechanism shown in FIG. 7, viewed from the left end of that figure.

The sections of the boom 31 are moved between their fully retracted positions, shown in full lines in FIG. 1, and fully extended positions, shown in FIGS. 7 and 9 by hydraulic rams, designated in general by the numeral 56.

As illustrated, each ram 56 comprises a cylinder formed of two telescoping sections 57 and 58 and a piston 59. The outer cylinder section 57 is connected to a bracket 61 at the inner end of the base section 32 of the boom, and the outer end of the piston is connected to a bracket 62 at the outer end of the boom section 34, as best shown in FIG. 9 of the drawings. The sections of the ram provide a multiple step operation in which the piston and the inner cylinder section move in sequence to effect the desired movement of the multiple sections of the boom.

The booms 31 are mounted upon turntables 36 rotatably mounted upon supporting base members 37 welded or otherwise secured to the outer end portions of the extensions 26. The turntables are arranged to be rotated about a vertical axis 38 by a sprocket gear 39 and chains 40 driven by hydraulic motors 42. The manner in which the booms are mounted and adjusted about the vertical axis 38 is similar to that disclosed in my prior Pat. No. 3,236,393 except that, in the present apparatus, each boom, when positioned above the level of the deck 30, may be rotated through a range of 360°; and, when extended below the level of the deck, through a range of about 270° around the end and sides of the machine. This wide range of horizontal angular adjustment permits the workmen supported by a platform 43 mounted at the outer end of a boom to reach all areas of adjacent quadrants of trees at both sides of the apparatus; and also permits either or both of the platforms to be moved into proximity with a central control pillar, as hereinafter more fully explained.

The booms 31 are pivotally mounted for angular adjustment through a wide range of vertical angular adjustment about horizontal axes 44 positioned near the top of supporting arms 45, as best shown in FIG. 1 of the drawings. The booms are swung up and down about the axes 44 by hydraulic rams 46 pivoted at their lower ends upon braces 47 connected to the turn tables 36 and the supporting arms 45, and at their upper ends to the base section 32 of the boom. The pivot points for the rams are positioned with respect to the braces 47 and the boom sections 32 to swing the boom through an arc such that the platform 43 may be moved from ground level to approximately tree-top level. The adjustment through vertical angles is similar to that shown in my prior Pat. No. 3,236,393, but in the present apparatus permits vertical angular adjustment of the height of the platform 43 through a wider range as the boom is shifted around the ends and sides of the carriage, as indicated in broken lines in FIG. 1 of the drawings.

The platforms 43 are pivotally supported upon brackets 48 mounted at the outer end of the outer sections 34 of the booms 31. The platforms 43 are provided with rails 49 supported at about waist height above the platforms by posts 50, and are of a size designed to accommodate two workmen standing side by side upon the platform of each boom. The platforms are so pivoted to the boom brackets 48 that the weight of the workmen upon the platforms tends to cause the assembly of platform 43, rails 49 and posts 50 to be suspended in a plumb position as the boom is adjusted through a vertical angle to any desired height. To stabilize the platform assembly in its plumb relation, and to prevent swinging as the boom is raised and lowered, an hydraulic ram 51 is connected to each boom near its outer end, as at 52, and to one of the posts 50 of the assembly, as at 53. Pivotal movement of the assembly as the boom is raised and lowered causes the piston portion of the ram to move within the cylinder portion. Hydraulic fluid is bypassed from one end of the cylinder to the other in conformity with displacement of the piston, and restriction of the rate of flow serves to stabilize the platform in its plumb relation with the platform itself substantially level throughout the range of vertical angular adjustment.

A chute designated in general by the numeral 65, is mounted in connection with each platform 43 and the rail 49 thereof. The chute has a wide funnel-like top portion 66 extending slightly above the rails across substantially the full width of the platform so as to be accessible to both workmen when standing upon the platform. The top portion 66 tapers to a tube-like delivery portion 67 opening into the outer end of the boom 31 on which the platform is mounted.

Figures 11, 12:
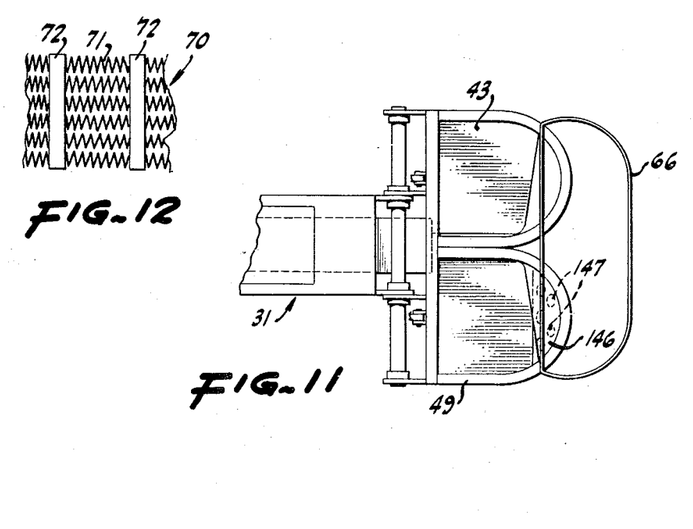
FIG. 11 is a fragmental view of the outer end of the boom showing in plan the platform supports for workmen.
FIG. 12 is a fragmental plan view of a short section of the conveyor belt operating within the boom.
Figure 13:
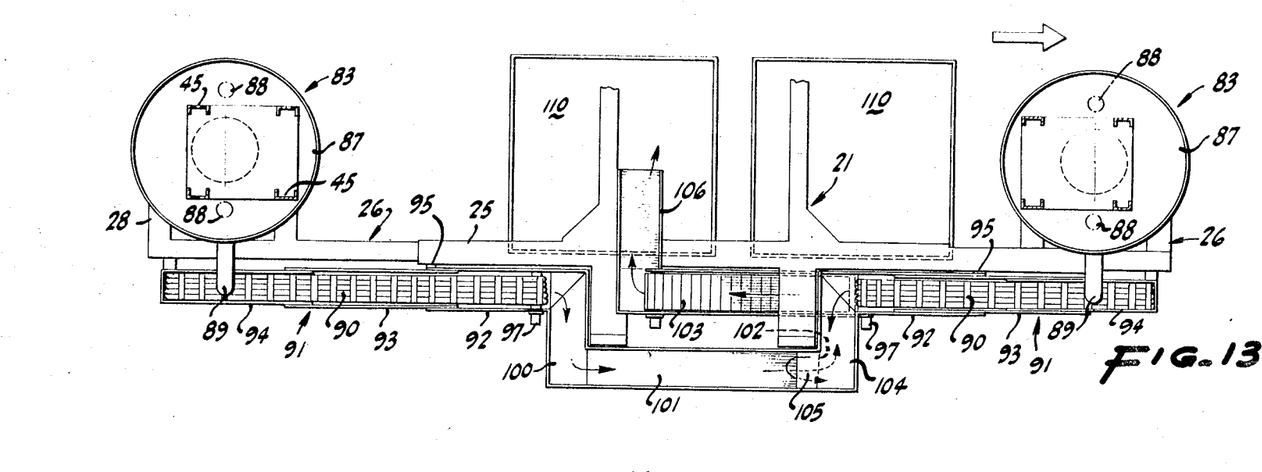
FIG. 13 is a fragmental plan view of a portion of the mechanism showing the arrangement of conveyor mechanism for delivering fruit from the booms to the fruit collecting hampers, the mechanism being viewed from the side opposite that shown in FIG. 5.
Figure 14:
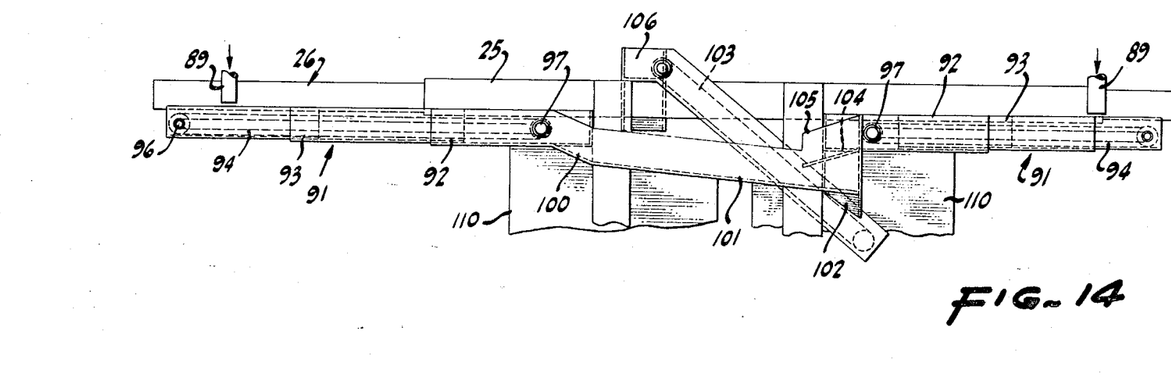
FIG. 14 is a side elevational view of the mechanism shown in FIG. 13.

An extensible conveyor, designated in general by the numeral 70, is mounted within each boom 31. The conveyor 70 is preferably formed of a plurality of endless coil springs 71 bonded together in proximate parallel relation by crossbars or cleats 72, as best shown in FIGS. 9 and 12 of the drawings. The springs stretch to the full length of the boom when it is moved to fully extended position, and contract to conform to the length of the boom when fully retracted, as more fully disclosed in my prior Pat. No. 3,294,216.

The conveyor 70 is enclosed within a casing, designated in general by the numeral 73, comprising a plurality of telescoping sections 74, 75 and 76 corresponding to the sections 32, 33, and 34 of the boom 31. The end sections of the casing are connected to the end sections of the boom and are arranged to be moved by and with the boom sections between the fully extended and fully retracted positions thereof. The outer ends of the casing sections 74 and 76 are rounded, as 77 and 78, above and below openings 79 and 80 in the ends of the outer casing members. The openings 80 at the outer end of the casing is spanned by a shroud 68 secured to the delivery end of the chute 65, the shroud being of a size and shape to cover the opening 80 in all positions of angular movement of the platform 43 and chute 65 relative to boom as the boom is raised and lowered throughout its range of vertical angular adjustment. In like manner, the opening 79 at the base end of the casing 73 is spanned by a shroud 81 secured to an outlet chute 82 through which fruit from the conveyor 70 is delivered for further handling as hereinafter described.

A fruit collecting tray, designated in general by the numeral 83, is mounted to surround the supporting structure by which each boom 31 is mounted upon an extensible frame section 26. As best shown in FIGS. 7 and 8 of the drawings, each tray 83 is provided with an inclined bottom 84 sloging laterally from one side of the extension 26 to the other. The tray is provided with a central opening 85 through which the upper portion of the turntable 36 extends, the bottom of the tray being offset, as at 86, to overlie the sprocket and sprocket chain 39–40. An upstanding peripheral flange or rim 87 extends around the tray. Fruit from the outlet chute 82 rolls through tubes 88 shaped to direct the fruit into the tray at points outside the turntable and the boom supporting structure carried thereby. The tray 83 remains stationary while the turntable and boom supporting framework is turned to adjust the boom about the axis 38, so as to catch the fruit delivered thereto in all position of angular adjustment of the boom. The inclination of the bottom 84 causes the fruit to roll to a delivery chute 89 extending laterally and downwardly from the low point of the tray.

From each chute 89 the fruit is delivered onto a transfer conveyor 90 extending lonigtudinally along an outer side of the carriage frame and extensions 26. Each conveyor 90 is preferably of extensible coil spring construction like that of the conveyors 70 above described; and operates within an extensible trough, designated in general by the numeral 91, comprising a plurality of telescoping sections 92, 93 and 94. The sections 92 are secured to the carriage frame, as at 95, and the sections 94 are connected to the sections 26, as at 96 so as to be extended and retracted by and with movement of the extensions 26 relative to the carriage frame members 25. The conveyor belts 90 operate over suitable pulleys one of which is motor driven through a suitable drive shaft 97 at the delivery end of each conveyor.

The conveyor 90 at the trailing end of the carriage transfers fruit from the tray 83 at that end of the carriage to a chute 100 extending laterally outwardly from the trough 91 to a chute 101 which extends longitudinally past the center of the carriage. The bottoms of the chutes 100 and 101 slope toward the center of the carriage so as to cause fruit to roll from the delivery end of the conveyor 90 to an extension 102 of the chute 101 extending laterally inwardly toward the carriage for delivering fruit to an elevator conveyor 103. At the leading end of the carriage, the conveyor 90 delivers fruit to a laterally extending chute 104 to a short extension 105 overlying the forward end of the chute 101 for delivering fruit into that chute and extension 102 thereof.

Fruit from both booms is conveyed to and delivered through the extension chute 102 to the elevator conveyor 103 by which the fruit is raised to a point above the level of the deck 30. From the elevator conveyor 103 the fruit is delivered into a chute 106 through which it is delivered either directly into a fruit collecting hamper or onto a suitable fruit grader. Since grading mechanisms are well known, and form no part of the present invention, no specific form of grading mechanism is illustrated in the drawings, or described in this specification. Alternatively, grading mechanism of conventional form, not illustrated, may be mounted in connection with any or all of the chutes and chute extensions 100, 101, 102, 104, 105 and 106, or grading may be performed manually along any of those chutes or the conveyors 90, if desired.

As hereinabove described, the carriage is of arch shape of width and height such as to straddle a hamper or bin of large capacity, and to define a passage through which such hampers may be moved longitudinally to and from a fruit receiving station in the center portion of the carraige. More particularly, the hampers, designated in general by the numeral 110, are of a size in the order of four feet square and four feet high, and a capacity in the order of one ton. A receptacle of the character disclosed in my prior Pat. No. 3,258,142 is appropriate for the purposes of the present invention, but is not essential as the hampers, or bins as they are sometimes called, may be of conventional box like construction, or of other suitable construction.

Figure 4:
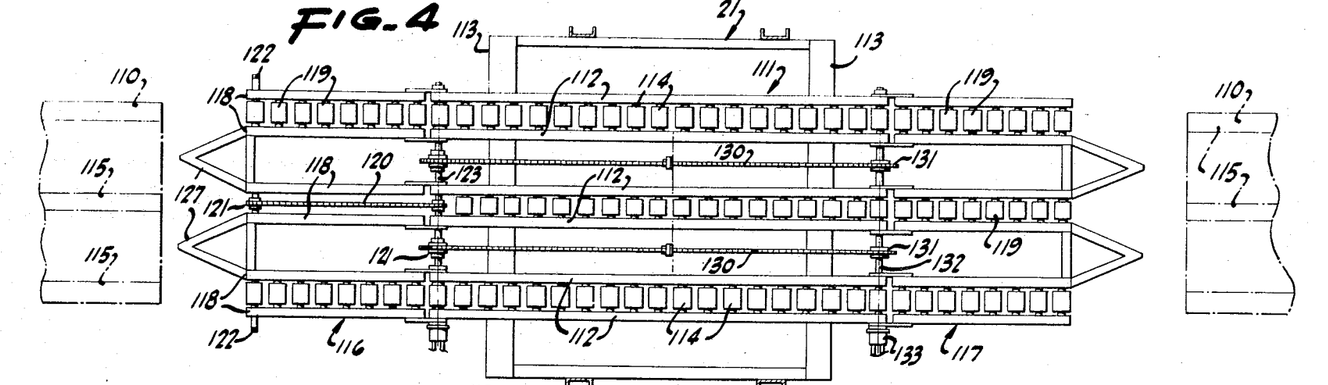
FIG. 4 is plan of the track and bin actuating mechanism as viewed in the plane indicated by the line 4—4 of FIG. 3 in the direction indicated by the arrows.
Figure 5:
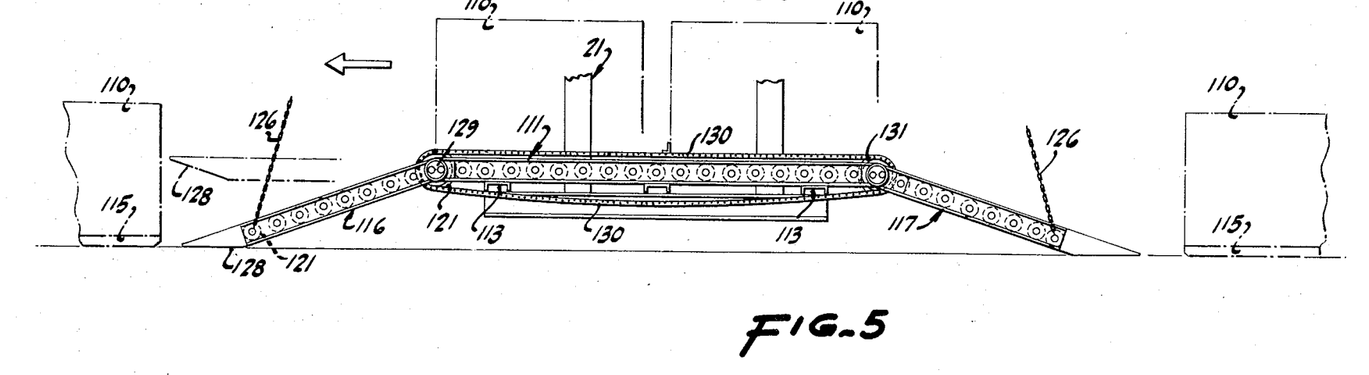
FIG. 5 is a fragmental side elevational view of the mechanism shown in FIG. 4.

The main carriage 21 is provided with a track, designated in general by the numeral 111, extending longitudinally from the front to the back of the carriage at a level slightly above ground level. As best shown in FIGS. 3, 4 and 5 of the drawings, the track comprises three pairs of rails 112 extending longitudinally of the carriage and supported by cross frame members 113 extending laterally across the width of the carriage between the side frame members 23 and 24. The rails are preferably appropriate lengths of structural iron or steel channels, the pairs being approximately evenly spaced between the side frame members. The channels of each pair are positioned with their backs toward each other and are spaced to accommodate rollers 114 journalled between the channels at appropriate intervals along the length of the track. The rollers 114 are positioned somewhat below the upper faces of the channels so that the upper edges of the channels serve as guides between which runners 115 on the bottoms of the hampers 110 are guided from the forward to the rearward end of the carriage.

Figure 6:
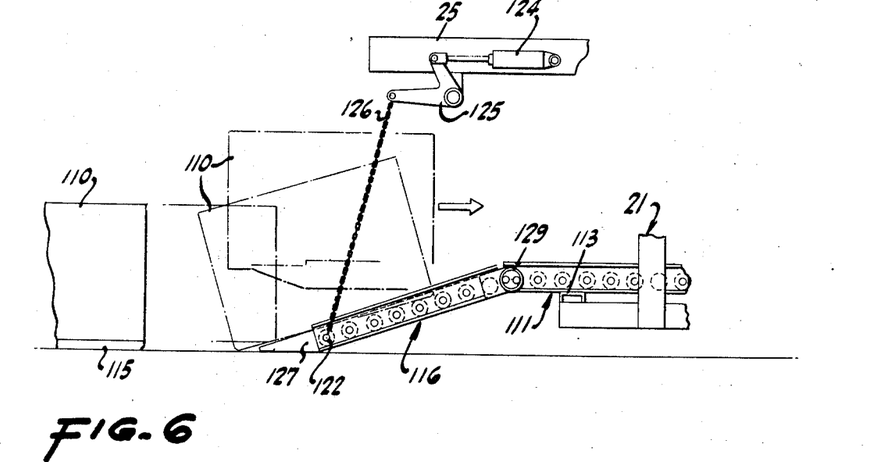
FIG. 6 is a fragmental view of the forward end of the bin actuating mechanism shown in FIG. 5, illustrating the mechanism for actuating the ramp over which hampers are moved to loading position.

Ramps 116 and 117 are pivotally mounted at the forward and rearward ends of the track 111 respectively. The forward ramp 116 comprises pairs of channel members 118 alined with the rails 112, and rollers 119 are journalled between the outer pairs in line with the rollers 114. Between the center channels is mounted a chain conveyor 120 operating over pulleys 121 upon shafts 122 and 123 at the forward and rearward ends of the ramp. The ramp 116 pivots on the shaft 123 for movement by a hydraulic ram 124 between a lowered position, shown in full lines, and a raised position shown in dotted lines in FIGS. 5 and 6. The ram 124 is mounted upon one of the frame members and actuates the ramp by means of a bell crank 125 one arm of which is connected to the ramp by a chain 126, as best shown in FIG. 6. Pointed lead members 127 are secured to the forward ends of the center pair of channel members 118 and the inner channel of the adjacent outer pair, as shown in FIG. 4. The members 127 are beveled on the under side, as at 128, so as to skid over the ground and to enter between the runners 115 of a hamper. The shaft 123 is driven by a suitable motor 129 to provide driving power for actuating the chain conveyor when the ramp is lowered to pick up a hamper.

The ramp 117 at the rear of the track 111 is similar to the forward ramp except that rollers 119 are mounted between the channels of the center pair instead of a chain conveyor 120, and mechanism to raise and lower the ramp is omitted. Filled hampers roll down the ramp 117 by gravity when displaced by movement of an empty hamper into the fruit receiving position.

Chain conveyors 130 are mounted between the center pair of channels 112 and the outer pairs, the conveyors being operable over pulleys 131 freely rotatable upon the shaft 123 at the forward end of the track 111 and a drive shaft 132 at the trailing end of the track, as shown in FIGS. 4 and 5. In this arrangement, a filled hamper is moved onto the trailing ramp 117 at the same time that an empty hamper is moved along the track to replace it, the filled hamper rolling by gravity down the ramp to the ground. Alternatively, the conveyors 130 may end at the forward edge of the fruit receiving station, the drive shaft 132 being positioned about midway along the track 111 instead of at the trailing end of the track, as illustrated. In such modified arrangement, an empty hamper may be moved to a waiting position immediately forward of the receiving station where it may remain stationary until the hamper at the receiving station becomes filled. At that time, the conveyors 132 may be activated to advance the empty hamper to the receiving station, thereby displacing the filled hamper onto the off ramp 117. Since such modification is obvious from the drawings and from this description, it is not separately illustrated in the drawings. In both arrangements, the drive shaft 132 is independently actuated by a suitable motor 133.

The apparatus as a whole is powered by a suitable internal combustion engine 140 which in turn operates a pump 141 for providing pressure in a hydraulic power system for propelling the apparatus, and providing power for actuating the various hydraulic motors and rams by which various units of the equipment are operated as above described. The apparatus is propelled by tractor tracks 142 mounted upon opposite sides of the carriage 21, and independently driven by suitable hydraulic motors in conventional manner for propelling and steering the apparatus along a desired course between rows of trees in an orchard. As illustrated, the engine 140 and pump 141 are mounted upon a bracket 143 extending rearwardly from one of the tracks 142, outside the main carriage frame. The bracket 143 is preferably pivoted as at 144 to accommodate irregularity of movement as the apparatus is moved over rough surfaces without imposing undue strain upon fuel supply and hydraulic pressure lines connected to the engine and pump. A fuel supply tank 145 is similarly mounted at the forward end of the track 142; and hydraulic fluid supply and pressure tanks are mounted in comparable manner upon one or the other sides of the carriage outside the main frame thereof. Since the structure and operative relationships of such units of equipment are well known in the art, and, other than by reason of the location thereof outside the sides of the carriage 21, form no part of the present invention, a detailed illustration and description of such units is herein unnecessary and is omitted herefrom.

Controls for energizing the various operating units of the apparatus are mounted in positions such as to permit the various units to be activated by workmen standing on the platforms 43 without dismounting from the platforms, and without requiring a separate operator. Thus, controls for extending and retracting the booms, and for moving them through wide ranges of angular adjustment about vertical and horizontal axes are mounted upon control panels, designated in general by the numeral 146, upon the platform 43 of each boom 31. The flow of power to each motor or ram operating to cause movement of each boom is controlled by a foot button 147 mounted on the panel 146 mounted thereon. By means of the control buttons 147 carried by each panel 146, one of the operators can extend the boom various distances, and shift it through vertical and horizontal angular adjustments, so that workmen standing upon the platform may reach any point of the adjacent quadrant of trees upon both sides of the carriage. The booms are separately controlled so that the workmen upon one boom need not be delayed by workmen on the other boom.

Controls for advancing and steering the carriage along the aisle between rows of trees in an orchard, for activating the conveyors by which the hampers are picked up and advanced to and from fruit receiving position within the carriage, and for extending and retracting the extensible frame sections 26 are mounted upon a central control pillar 150 mounted at about the center of the deck 30 midway between the booms 31. The pillar 150 is so positioned and of a height such that it is accessible from one or both of the platforms 43 without requiring the workman assigned to operate the apparatus as a whole to dismount from his platform. For example, if a hamper occupying the fruit receiving station becomes filled before the fruit has been fully harvested from adjacent trees at the position then occupied by the carriage, the assigned workman may manipulate his platform to a position near the pillar 51 and activate the conveyors 130 to move a hamper from the waiting position to the fruit receiving station, as above described, thereby making a second hamper available to receive the harvested fruit without advancing the carriage.

When fruit from the adjacent quadrants of trees at opposite sides of the forward and rearward ends of the carriage has been fully harvested, the assigned workman then moves his platform to a position adjacent the control pillar 150 and operates the controls to advance to the next group of trees. In this operation, the tractor tracks 142 are actuated to move and steer the carriage forwardly along the aisle between trees. In anticipation of the harvesting operation, hampers 110 are placed at appropriate intervals along the path to be followed by the apparatus through an orchard. As the carriage is advanced from one group of trees to the next, the control operator lowers the forward ramp 116 so that the beveled surfaces 128 will ride over the ground and the pointed lead members 127 will enter between the runners 115 of a hamper. As the carriage advances, the lead members will move under the hamper sufficiently to cause it to be picked up by the conveyor 120 and be moved thereby upwardly along the ramp 116 to a position such that it will be picked by the conveyors 130 and moved to its waiting position. At the same time, a filled hamper which may be then displaced onto the off-ramp 117 will be dropped off at the rear of the carriage, where it may be picked up for transportation away from the orchard. As the oncoming hamper approaches the forward end of the track 111, the forward ramp 116 is raised enough to clear the ground and prevent any obstruction to forward movement of the carriage over rough ground.

The various controls grouped together on the pillar 150 are of conventional structure well known in the art, and, other than as to the grouping of controls upon a single control pillar accessible to a workman carried by one of the booms 31 and platforms 43, form no part of the present invention. A detailed disclosure of the specific structures thereof is unnecessary and is therefore omitted herefrom.

I claim:

1. Orchard apparatus comprising an arch-shaped frame having top and side portions extending longitudinally of the frame and arranged to straddle large fruit collecting hampers each having a capacity in the order of one ton placed at intervals along an aisle between two rows of orchard trees, said frame defining a passage along which such fruit collecting hampers may be moved to and from a fruit receiving station between pickup and delivery points at opposite ends of the frame in a substantially horizontal plane, a track extending longitudinally of the frame between the bottom ends of the side portions thereof immediately above ground level, ramps at the forward and trailing ends of the frame arranged to guide hampers onto and off from the track, means supporting workmen in variable positions for picking fruit from adjacent trees, means for conveying the picked fruit to hampers moved successively to and from the fruit receiving station, and drive mechanism mounted laterally outside the lower side portions of the frame, said mechanism being operable for propelling the apparatus along an aisle between rows of orchard trees to pick up such hampers successively without obstructing movement of hampers through the passage as the apparatus is advanced along the aisle.

2. Orchard apparatus as defined by claim 1 provided with means for raising and normally holding the forward ramp in a ground clearing position and for lowering the ramp for movement under an end of a hamper positioned in the path of the apparatus as the apparatus is advanced along the aisle.

3. Orchard apparatus as defined by claim 1 wherein the forward ramp is provided with power actuated means for engaging and moving hampers onto the track for movement along the track to the fruit receiving station intermediate the ends of the passage.

4. Orchard apparatus as defined by claim 1 wherein the track includes rollers over which a hamper may move to the fruit receiving station, and the forward ramp is provided with power actuated means for engaging and moving hampers upwardly along the ramp onto and along the track.

5. Orchard apparatus as defined by claim 1 wherein the track includes rollers over which a hamper may be moved to the fruit receiving station and the forward ramp is pivotally movable to and from ground engaging position, means normally holding the ramp in ground clearing position and operable to lower the forward edge of the ramp to ground level for movement under an end of a hamper placed in the path of the apparatus as the apparatus is advanced along the aisle, and power actuated means mounted upon said ramp for engaging and moving such hamper upwardly along the ramp onto and along the track.

6. Orchard apparatus comprising a mobile arch-shaped carriage having top and side frame members arranged to straddle large fruit collecting hampers each having a capacity in the order of one ton and to define a passage extending longitudinally through the carriage through which such hampers may pass successively as the carriage moves along an aisle between adjacent rows of orchard trees, track means mounted in a substantially horizontal position adjacent the bottom ends of the side frame members and extending immediately above ground level between the sides of the frame from the leading to the trailing ends of the carriage, ramps mounted at the forward and trailing ends of the frame in alignment with the track, means for moving fruit receiving hampers onto and along said ramps and said track means to and from a fruit receiving station intermediate the ends of the passage, extensible booms mounted upon end portions of the carriage and arranged to be moved through wide angles of horizontal and vertical adjustment, platforms mounted upon the outer ends of the booms and arranged to support workmen in variable positions around adjacent trees for harvesting fruit therefrom, and means for conveying fruit from the platforms to a hamper at the fruit receiving station.

7. Orchard apparatus as defined by claim 6 wherein the booms are independently movable though substantially 360° of adjustment about vertical axes above the frame, and for adjustment about horizontal axes through angles sufficient to move the workmen from ground level to substantially tree top level.

8. Orchard apparatus as defined by claim 6 wherein the booms are independently adjustable through substantially 360° around a vertical axis and through approximately 90° around a horizontal axis, fruit collecting means positioned to receive fruit from the bottom ends of the booms, means for conveying fruit from the workmen's platforms to the fruit collecting means and means for conveying fruit from the collecting means to a hamper positioned at the fruit receiving station.

9. Orchard apparatus comprising a mobile arch-shaped carriage having top and side frame members arranged to straddle large fruit collecting hampers each having a capacity in the order of one ton placed at intervals along an aisle between two adjacent rows of orchard trees and to define a passage extending longitudinally through the length of the carriage, track means mounted upon and between the side frame members adjacent the bottom ends of the side frame members in a substantially horizontal plane immediately above ground level, ramps mounted at the forward and trailing ends of the frame in alignment with the track, means for moving fruit receiving hampers along said ramps and track means to and from a fruit receiving station within the passage intermediate its ends successively as the carriage is advanced along such aisle, a substantially level deck overlying the frame, extensible booms mounted over the deck at opposite ends of the frame, the booms being adjustable through substantially 360° of rotative movement above the deck and through substantially 90° of vertical angular adjustment at the sides and ends of the deck, workmen's platforms mounted at the outer ends of the booms, and means for conveying fruit from the workmen's platforms at any position thereof to a hamper positioned at the fruit receiving station.

10. Orchard apparatus as defined by claim 9 wherein each platform is arranged to support two workmen standing side by side thereon and carried together around various areas of adjacent trees.

11. Orchard apparatus as defined by claim 9 wherein each platform is provided with control means operable by a workman supported upon the platform for independently adjusting the position of the platform relative to adjacent trees.

12. Orchard apparatus as defined by claim 9 provided with a control pillar positioned substantially centrally of the deck and accessible to a workman carried by one of the platforms when moved to a position adjacent said pillar, and control mechanism mounted in connection with said pillar for controlling operation of the apparatus whereby a workman may operate the apparatus without leaving his supporting platform.

13. Orchard apparatus comprising a mobile carriage having top and side frame members arranged to define a passage extending longitudinally through the length of the carriage, track means mounted upon and between the side frame members along the bottom of the passage slightly above ground level, means for moving fruit receiving hampers along the track to and from a fruit receiving station within the passage successively as the carriage is advanced through an orchard, a substantially level deck overlying the frame, extensible booms mounted over the deck at opposite ends of the frame, the booms being adjustable through substantially 360° of rotative movement above the deck and through substantially 90° of vertical angular adjustment at the sides and ends of the deck, workmen's platforms mounted at the outer ends of the booms, a control pillar positioned substantially centrally of the deck and accesible to a workman carried by one of the platforms when moved to a position adjacent said pillar, separate controls mounted upon said pillar and connected to mechanisms controlled respectively thereby including drive mechanism, steering mechanism, and hamper pick up and delivery mechanism mounted upon the carriage whereby a workman may operate any and all of said controls without leaving his supporting platform, and means for conveying fruit from the workmen's platforms at any position thereof to a hamper positioned at the fruit receiving station.

14. Orchard apparatus as defined by claim 1 wherein the top portion of the frame comprises a central section and end sections mounted in connection with the central section at opposite ends thereof and movable relative thereto between extended and retracted positions, an extensible boom mounted above the frame at each end thereof, each boom being connected to a telescoping top frame portion for independent movement thereby and therewith between extended and retracted positions, means for adjusting the booms through a wide degree of angular adjustment about horizontal and vertical axes; and conveying means extensible with the extensible top frame sections for conveying fruit from the booms to a hamper positioned at the fruit receiving station within the frame.

15. Orchard apparatus as defined by claim 1 wherein the top portion of the frame comprises a central section and extensible end sections telescoping with the central section, an extensible boom mounted above the frame at each end thereof, each boom being connected to a telescoping top frame portion for independent movement thereby and therewith between extended and retracted position means for adjusting the booms through a wide degree of angular adjustment about horizontal and vertical axes; a fruit collecting tray mounted adjacent the inner end of each boom and arranged to permit movement of the boom relative thereto throughout its range of horizontal and vertical angular adjustment, conveying means mounted within each boom and extensible therewith for conveying fruit from the outer ends of the booms to the collecting tray, and conveying means extensible with the extensible top frame section for conveying fruit from the collecting tray to a hamper positioned at the fruit receiving station within the frame.

16. Orchard apparatus comprising an arch-shaped frame having side and top frame members arranged to straddle large fruit collecting hampers each having a capacity in the order of one ton placed at intervals along an aisle between two adjacent rows of orchard trees and to define a passage extending longitudinally through the frame through which such hampers may be moved from the leading end through the trailing end of the frame, conveyor means operable along a substantially horizontal plane at substantially the level of the bottom ends of the side frame members immediately above ground level, for moving such hampers successively to and from a fruit receiving station within the passage between the ends of the frame, ramps mounted at the forward and trailing ends of the frame in alignment with said conveyor means and arranged to direct hampers onto and off from said conveyor means, means for supporting workmen at variable points above and around the frame, means for conveying fruit picked by such workmen to hampers successively moved to and from the fruit receiving station, tractor tracks operably mounted laterally outwardly of the side members of the frame, hydraulic motors operably connected to the tractor tracks for actuating the tracks on each side of the frame independently of the tractor tracks on the other side of the frame to propel and steer the apparatus, a prime power unit and a tank for supplying fuel thereto, mounted outside of the side frame members, and a hydraulic pump mounted in connection with said prime power unit and driven thereby to supply hydraulic power to the motors.

17. Orchard apparatus as defined by claim 16 wherein the prime power unit is mounted upon a bracket pivotally mounted upon the frame and extending longitudinally therefrom in a normally level position in substantial alinement with one of the tractor tracks, said bracket being arranged to be swung to an upwardly inclined position by engagement with the ground when moved over abrupt irregularities of the ground surface.

18. Orchard apparatus as defied by claim 16 wherein the prime power unit and the fuel supply tank therefor are independently mounted upon brackets pivotally mounted upon side frame members of the frame and arranged to extend longitudinally therefrom in a normally level position in substantial alinement with a tractor track, each bracket being independently movable to an upwardly inclined position by engagement with the ground as the tracks pass over abrupt irregularities of the ground surface.

19. Orchard apparatus as defined by claim 16 wherein the frame is provided with brackets pivotally connected to the frame outside the side members thereof and extending, forwardly and rearwardly therefrom in substantially longitudinal alinement with adjacent tractor tracks, said brackets being independently displaceable from normally level positions to upwardly inclined positions by engagement with the ground ahead of and behind said tractor tracks as they approach and pass steep inclines, said brackets providing mounting supports for the prime power unit, and fuel supply tank for operating the apparatus.

20. Orchard apparatus as defined by claim 16 wherein the frame is provided with brackets pivotally connected to the frame outside the side members thereof and extending forwardly and rearwardly therefrom in substantially longitudinal alinement with adjacent tractor tracks, each bracket being arranged to be displaced from a normal level position to an upwardly inclined position by engagement with the ground ahead of or behind the tractor tracks as they approach and pass over steep inclines, the prime power unit being mounted upon and movable with the bracket at the trailing end of the frame and the fuel supply tank being mounted upon and movable with the bracket at the leading end of the frame.

References Cited

UNITED STATES PATENTS 3,437,174    4/1969    Coblentz      214—183.1

WAYNE A. MORSE, Jr., Primary Examiner

U.S. Cl. X.R.

56—1; 172—28; 214—83.1, 83.14